(No Model.)
T. J. BARBOUR & C. M. HANSEN.
AIR COMPRESSING ENGINE.
No. 591,584. Patented Oct. 12, 1897.
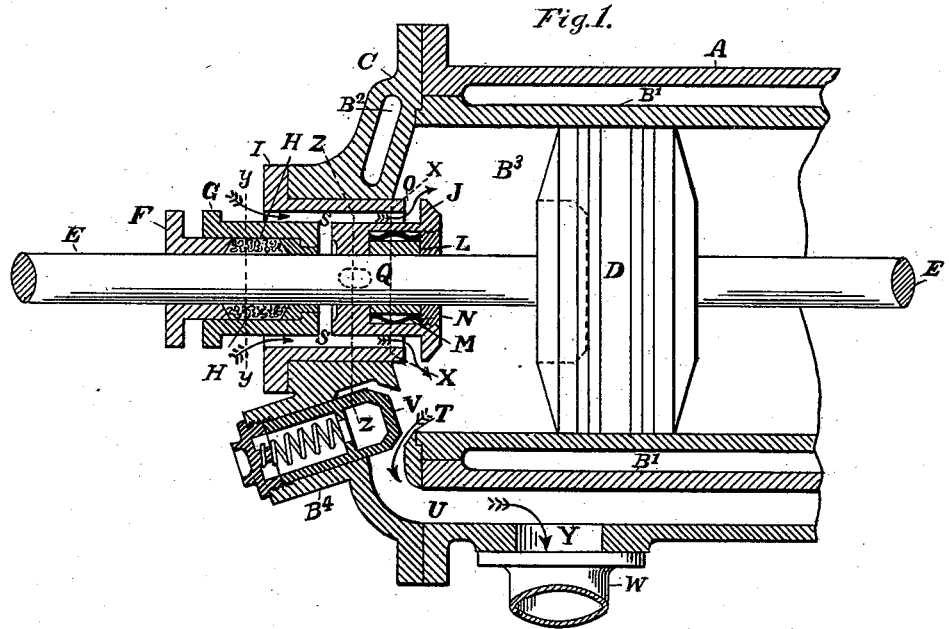
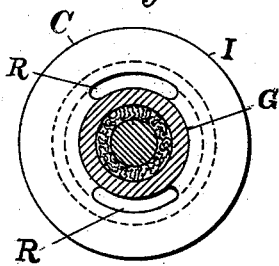
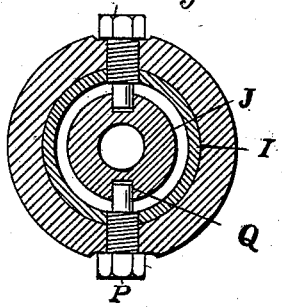
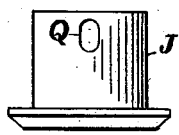
Witnesses.
K. Lockwood-Nevins.
Willard F. Grover.
Inventors:
Thos. J. Barbour
Christian M. Hansen
By J. Richards
Atty

UNITED STATES PATENT OFFICE.

THOMAS J. BARBOUR AND CHRISTIAN M. HANSEN, OF SAN FRANCISCO, CALIFORNIA, ASSIGNORS TO THE RISDON IRON AND LOCOMOTIVE WORKS, OF SAME PLACE.

AIR-COMPRESSING ENGINE.

SPECIFICATION forming part of Letters Patent No. 591,584, dated October 12, 1897.

Application filed April 30, 1896. Serial No. 589,680. (No model.)

*To all whom it may concern:*

Be it known that we, THOMAS J. BARBOUR and CHRISTIAN M. HANSEN, citizens of the United States, residing in the city and county of San Francisco, State of California, have invented certain new and useful Improvements in Air-Compressing Engines, of which the following is a specification.

Our invention relates to the induction or inlet valves of what are called "air-compressors" and to a method of securing a more complete action of such valves.

Our improvements consists of annular induction-valves mounted on and moved outward by friction on the piston-rod of the engine and placed within or behind the packing-gland and stuffing-box, abutting thereagainst on the outward or expelling stroke, and also against an annular seat within the cylinder.

Our invention also includes means of creating a constant amount of friction between the valve and the piston-rod by means of metallic surfaces held in contact by springs and in other features to be hereinafter pointed out.

The objects of our invention are to secure an early opening and closing of the induction-valves, aided by friction of the piston-rod, and to render such action of the piston-rod constant.

Referring to the drawings, Figure 1 is a partial longitudinal section through the axis of one end of an air-compressing cylinder provided with our improvements. Fig. 2 is a transverse view, partially in section, on the line $y\ y$ in Fig. 1. Fig. 3 is a transverse section on the line $z\ z$ in Fig. 1. Fig. 4 is a cross-section on the line $x\ x$ in Fig. 1. Fig. 5 is a side view of the valve detached.

Similar letters of reference are employed to designate like parts throughout.

The main cylinder A is of the usual construction, having an external annular chamber B', through which is circulated cooling-water.

C is the cylinder-head, also provided with a cooling-chamber $B^2$.

D is the piston, and E the piston-rod, both of the usual construction.

F is a packing-gland, and G a stuffing-box containing the usual fibrous or other packing H.

I is a shell fitting into the cylinder-head C and sustaining the packing-box G, as seen in Fig. 2, and extending inward to form a valve-seat.

J is the induction-valve, supported and sliding on the piston-rod E, and shown in an open position in Fig. 1. This valve J is bored so as to slide freely on the piston-rod E, and is provided on its interior with rectangular recesses K to receive the friction-blocks L and springs M, preferably at four points, as seen in Fig. 4. These friction-blocks L and springs M are inserted from the end of the valve J, which is then closed by a screw-threaded follower-ring N, as seen in Fig. 1.

The springs M are made stiff enough to cause friction between the blocks L and the piston-rod E, so that when the piston D is moved inward and the chamber $B^3$ is to be filled with air the valve is moved at the same time and opens as soon as the piston-rod moves to the extent of the valve's traverse, as seen at O, and in advance of air-pressure caused by the vacuum.

The stroke of the valve J is regulated by the screws P P, that pass through the nozzle of the cylinder-head C, also through the shell I, holding that in place, and then extending into the oblong recesses Q in the sides of the valve J, as seen in Figs. 3 and 5, thus keeping the valve from turning and limiting its inward stroke to the distance O, as seen in Fig. 1.

On the inward or induction stroke of the piston D air enters through the inlets R R and passes into the chamber $B^3$, as indicated by arrows in Fig. 1. When the stroke of the piston is reversed and begins to compress the air in the chamber $B^3$, then the movement of the piston-rod E drags the valve J outward and closes it at O as soon as movement begins. At the same time the valve J abuts at S against the packing-box G, so that any air escaping through the interior of the valve J around the piston-rod E is stopped by the packing H. It is confined between the valve J and packing-box G and cannot escape because of the packing H.

$B^4$ is a chamber or cage to receive the eduction-valves V, that bear on the seat at T, and when opened by pressure in the chamber $B^3$ permits the compressed air to flow down into the passage U and out at the escape-way Y into the pipe W to be conducted to a receiver or some purpose of application.

It will be understood that while only one end of the compressing-engine has been described the other end is fitted in the same manner, the piston-rod E extending through for that purpose. In this manner it will be seen that the tractive effect of the piston-rod E on the blocks L and the valve J is constant when once adjusted, and the stuffing-box G and gland F can be stationary and permanently attached to the shell I, and thus to the cylinder-head C.

Having thus explained the nature and objects of our invention and the manner of constructing and applying the same, what we claim is—

In an air-compressing engine, the combination of the cylinder-head C, shell I, having openings R R, packing-box G, and packing-gland F, with the piston-rod E, annular inlet-valve J provided with openings Q, friction-blocks L, springs M, and screw-pins P, whereby the said annular valve is prevented from turning, and its range is limited, said valve J being also seated both at O and S, substantially as shown and described.

In testimony whereof we have hereunto affixed our signatures in the presence of two witnesses.

THOS. J. BARBOUR.
CHRISTIAN M. HANSEN.

Witnesses:
W. E. CARROLL,
R. H. MOORE.